United States Patent
Davis et al.

(10) Patent No.: US 7,169,497 B2
(45) Date of Patent: Jan. 30, 2007

(54) ELECTROCHEMICAL CELLS

(75) Inventors: Stuart M. Davis, Norfolk, MA (US); Klaus Brandt, Kamenz (DE)

(73) Assignee: The Gillette Company, Boston, MA (US)

( * ) Notice: Subject to any disclaimer, the term of this patent is extended or adjusted under 35 U.S.C. 154(b) by 522 days.

(21) Appl. No.: 10/438,318

(22) Filed: May 15, 2003

(65) Prior Publication Data

US 2004/0229090 A1    Nov. 18, 2004

(51) Int. Cl.
*H01M 12/04* (2006.01)
*H01M 8/06* (2006.01)

(52) U.S. Cl. ............................. 429/27; 429/19; 429/29

(58) Field of Classification Search ............... None
See application file for complete search history.

(56) References Cited

U.S. PATENT DOCUMENTS

| | | | |
|---|---|---|---|
| 3,133,837 A | | 5/1964 | Eidensohn |
| 3,607,427 A | * | 9/1971 | White ........................ 429/20 |
| 4,436,793 A | * | 3/1984 | Adlhart ...................... 429/17 |
| 5,242,565 A | | 9/1993 | Winsel |
| 5,427,870 A | | 6/1995 | Joshi et al. |
| 5,454,922 A | | 10/1995 | Joshi et al. |
| 5,593,552 A | | 1/1997 | Joshi et al. |
| 5,681,435 A | | 10/1997 | Joshi et al. |
| 5,702,491 A | | 12/1997 | Long et al. |
| 5,921,251 A | | 7/1999 | Joshi |
| 5,932,204 A | | 8/1999 | Joshi |
| 5,951,538 A | | 9/1999 | Joshi et al. |
| 6,135,126 A | | 10/2000 | Joshi |
| 6,534,033 B1 | | 3/2003 | Amendola et al. |
| 6,544,400 B2 | | 4/2003 | Hockaday et al. |
| 6,554,877 B2 | | 4/2003 | Finkelshtain et al. |
| 6,569,298 B2 | * | 5/2003 | Merida-Donis ............. 204/263 |
| 2002/0076588 A1 | | 6/2002 | Singh et al. |
| 2003/0051785 A1 | | 3/2003 | Gauthier et al. |
| 2003/0162059 A1 | * | 8/2003 | Gelsey ........................ 429/17 |

FOREIGN PATENT DOCUMENTS

EP    1 249 427 A1    3/2003

OTHER PUBLICATIONS

Pragmatic Vision International LLC, "Platinum as Paparazzi: Minimizing Catalyst While Maximizing Electrode Performance" Available Web Site: http://www.yet2.com/app/insight/techofweek/24637?sid=70.

Williford, R.E. et al., "A combined passive water vapor exchanger and exhaust gas diffusion barrier for fuel cell applications", *J. Power Sources*, vol. 112, pp. 570-576; 2002.

* cited by examiner

*Primary Examiner*—Patrick Joseph Ryan
*Assistant Examiner*—Karie O'Neill
(74) *Attorney, Agent, or Firm*—Fish & Richardson P.C.

(57) ABSTRACT

An electrochemical cell includes a hydrogen generator and a hydrogen fuel cell.

26 Claims, 4 Drawing Sheets

ELECTROCHEMICAL CELLS

TECHNICAL FIELD

This invention relates to electrochemical cells.

BACKGROUND

An electrochemical cell is a device capable of providing electrical energy from an electrochemical reaction, typically between two or more reactants. Generally, an electrochemical cell includes two electrodes, called an anode and a cathode, and an electrolyte disposed between the electrodes. In order to prevent direct reaction of the active material of the anode and the active material of the cathode, the electrodes are electrically isolated from each other by a separator.

In one type of electrochemical cell, sometimes called a hydrogen fuel cell, the anode reactant is hydrogen gas, and the cathode reactant is oxygen (e.g., from air). At the anode, oxidation of hydrogen produces protons and electrons. The protons flow from the anode, through the electrolyte, and to the cathode. The electrons flow from the anode to the cathode through an external electrical conductor, which can provide electrical energy. At the cathode, the protons and the electrons react with oxygen to form water.

In another type of electrochemical cell, called a metal-air cell, oxygen is reduced at the cathode, and a metal (e.g., zinc) is oxidized at the anode. Electrons flow from the anode to the cathode through an external electrical conductor, which can provide electrical energy. Oxygen can be supplied to the cathode from the atmospheric air external to the cell through one or more air hole(s) in the cell housing. An electrolytic solution (e.g., an alkaline electrolyte, such as a potassium hydroxide solution) in contact with the electrodes contains ions that flow through the separator between the electrodes to maintain charge balance throughout the cell during discharge.

Metal-air cells can experience carbonation, in which the alkaline electrolyte in the cathode absorbs carbon dioxide, resulting in the precipitation of carbonate salts (such as potassium carbonate or sodium carbonate). These salts can have a detrimental effect on the cell by, for example, blocking cathode pores or air access holes on the cathode side of the cell envelope. A result can be that the cathode has less access to the oxygen it needs to function.

Furthermore, a metal-air cell can experience water exchange with its environment, as a result of the difference in the relative humidity of the environment and the equilibrium vapor pressure of the cell electrolyte. When the ambient air is drier (i.e., has a lower partial pressure of water vapor) than the electrolyte, the cell can lose water to the environment and dry out. On the other hand, when the ambient air is wetter (i.e., has a higher partial pressure of water vapor) than the electrolyte, the cell can gain water, such that the cathode ultimately floods with electrolyte solution. In either case, a consequence is that the cell can lose its ability to support heavy currents. Additionally, when the cathode is flooded with electrolyte solution, the electrolyte solution can eventually leak out of the air access holes.

SUMMARY

In general, an electrochemical cell includes an electrochemical hydrogen generator connected to a hydrogen fuel cell. The hydrogen generator and the fuel cell can be electrically and/or mechanically connected.

In one aspect, an electrochemical cell includes an electrochemical hydrogen generator and a hydrogen fuel cell. The electrochemical hydrogen generator has a first cathode which generates hydrogen gas, and a first anode which is adjacent to the first cathode. The hydrogen fuel cell includes a second anode which oxidizes hydrogen gas, and a second cathode which is adjacent to the second anode. The first anode is electrically connected to the second cathode, and the first cathode is electrically connected to the second anode.

In another aspect, an electrochemical cell includes an electrochemical hydrogen generator in series electrical connection with a hydrogen fuel cell.

In some embodiments, the electrochemical hydrogen generator includes a first cathode which generates hydrogen gas and a first anode which is adjacent to the first cathode. The hydrogen fuel cell can include a second anode which oxidizes hydrogen gas and a second cathode which is adjacent to the second anode. In some cases, the first anode is electrically connected to the second cathode and the first cathode is electrically connected to the second anode.

In some embodiments, the hydrogen fuel cell includes a second anode which oxidizes hydrogen gas and a second cathode which is adjacent to the second anode.

In some cases, the hydrogen generator includes a gas outlet, and the hydrogen fuel cell includes a gas inlet in fluid communication with the gas outlet. The hydrogen generator can have a first housing. The hydrogen fuel cell can include a second housing. In some embodiments, the first housing is releasably engageable with the second housing. In some cases, the hydrogen fuel cell and the hydrogen generator are disposed within a single housing.

The hydrogen generator can include a hydrogen-generating anode. The hydrogen-generating anode can be a metal (e.g., zinc, aluminum, titanium, zirconium, and tin). The hydrogen-generating anode can include a hydrogen storage composition (e.g., a metal hydride or a misch metal alloy).

In some cases, the hydrogen fuel cell has an acidic polymer membrane electrolyte.

In some embodiments, the electrochemical cell further includes a controller. The electrochemical cell can further include a sensor. The sensor can be connected to the controller.

In another aspect, an electrochemical cell includes an electrochemical hydrogen generator and a hydrogen fuel cell. The hydrogen generator has a first cathode which generates hydrogen gas, and a first anode which is opposed to the first cathode. The hydrogen fuel cell has a second anode which oxidizes hydrogen gas, and a second cathode which is opposed to the second anode. There is a coupling between the hydrogen generator and the hydrogen fuel cell. The coupling fluidly connects the first cathode to the second anode.

In some embodiments, the hydrogen generator further includes a first housing within which the first anode and the first cathode are disposed. In some cases, the hydrogen fuel cell further includes a second housing within which the second anode and the second cathode are disposed. The second housing can be releasably engageable with the first housing.

The first anode can be electrically connected to the second cathode.

In another aspect, a method of generating an electrical current includes forming an electrical connection between a first anode of an electrochemical hydrogen generator and a second cathode of a hydrogen fuel cell, and forming an electrical connection between a first cathode of the electrochemical hydrogen generator and a second anode of the hydrogen fuel cell.

In some cases, the first cathode generates hydrogen gas, and the first anode is adjacent to the first cathode. The second anode can oxidize hydrogen gas, and the second cathode can be adjacent to the second anode.

In another aspect, a method of generating an electrical current includes generating a first electron from an oxidation half cell of an electrochemical hydrogen generator, and transmitting the first electron to a reduction half cell of a hydrogen fuel cell.

In some embodiments, the method further includes transmitting a second electron from an oxidation half cell of the hydrogen fuel cell to a reduction half cell of the hydrogen generator. The method can further include generating hydrogen from the hydrogen generator and oxidizing the generated hydrogen at the fuel cell. In some cases, the method further includes transmitting the generated hydrogen to the fuel cell through a conduit fluidly connecting the hydrogen generator and the fuel cell.

In another aspect, an electrochemical hydrogen generator includes a housing with a hydrogen outlet, an anode in the housing including an oxidizable material, a cathode in the housing including a hydrogen generation catalyst, and an ionically conductive, electrically insulative separator layer between the anode and the cathode.

In some cases, the hydrogen generator further includes an aqueous ionic electrolyte within the housing.

The oxidizable material can include a metal (e.g., a Group IIa metal, a Group Ib metal, a Group IIIa metal, a Group IIb metal, iron, tin, manganese, titanium, zirconium, or a combination thereof).

The separator can include a non-woven fibrous polymer fabric (e.g., polyvinyl alcohol fibers). In some cases, the non-woven fibrous polymer fabric is laminated to cellophane.

In some embodiments, the cathode further includes a binder (e.g., high density polyethylene or polytetrafluoroethylene) containing the catalyst.

The hydrogen outlet can include a hydrophobic membrane arranged to prevent leakage of a liquid from the housing.

The oxidizable material can include a metal hydride (e.g., titanium hydride, zirconium hydride, a reversible hydride of nickel or lanthanum, or a misch metal alloy). In some cases, the oxidizable material includes a metal (e.g., zinc, aluminum, titanium, zirconium, or tin).

The hydrogen generator can further include an alkaline electrolyte (e.g., aqueous sodium hydroxide or aqueous potassium hydroxide) disposed in the housing.

The anode and the cathode can be connected by an electronic conductor, and the electronic conductor can include a switch.

Embodiments of a hydrogen generator can include one or more of the following advantages. The hydrogen generator can have competitive volumetric and gravimetric capacities relative to other hydrogen sources. In some cases, the hydrogen generator can be safer than hydrogen sources based on liquid hydrogen, compressed hydrogen gas, metal hydride storage alloys, or active metal hydrides. The hydrogen generator can experience reduced leakage of hydrogen gas and/or electrolyte compared to other hydrogen sources.

In embodiments in which the anode layer of the hydrogen generator is exposed to cathode material on two of its sides, the hydrogen generator can produce more hydrogen gas than a comparable hydrogen generator without such a structure.

The hydrogen generator can be activated or deactivated in accordance with hydrogen gas demand, which can be regulated by closing an electrical circuit on the generator. When the hydrogen generator is deactivated, the generator does not exhibit a substantial internal pressure of hydrogen. The components of the hydrogen generator can be relatively inexpensive, compared to the components of other hydrogen sources.

The hydrogen generator can provide fuel to a fuel cell safely and reliably, and in a controllable manner. The hydrogen generator can be an economical, compact, portable, and/or disposable source of hydrogen gas. The hydrogen generator can be of a low weight relative to hydrogen sources employing reversible metal hydride alloys. The materials used in the hydrogen generator can be environmentally benign or can have minimal environmental impact. For example, a used hydrogen generator can have products substantially similar to those of a used alkaline battery. Thus, the hydrogen generator can be easily discarded, without the necessity of taking extra precautions. The hydrogen generator can withstand exposure to moderately high temperatures (e.g., 71° C.) without generating excessive quantities of unwanted hydrogen gas or dangerous internal pressures. The hydrogen generator can have a shelf life of at least ten years, such that it can be stored prior to initial use and between uses, without losing its ability to be activated or reactivated.

Embodiments of an electrochemical cell including a fuel cell and a hydrogen generator can include one or more of the following advantages. The electrochemical cell can experience reduced carbonation, drying, and/or flooding relative to a conventional metal-air cell. The electrochemical cell can therefore have an improved activated stand life relative to a conventional metal-air cell. In embodiments in which the electrochemical cell includes a water-recycling feature, the cell can be smaller and lighter, and can have an increased volumetric capacity for hydrogen gas, relative to a cell without the water-recycling feature. The electrochemical cell can produce a higher voltage than a conventional fuel cell.

The details of one or more embodiments of the invention are set forth in the accompanying drawings and the description below. Other features and advantages of the invention will be apparent from the description and drawings, and from the claims.

DETAILED DESCRIPTION

Figure 1:
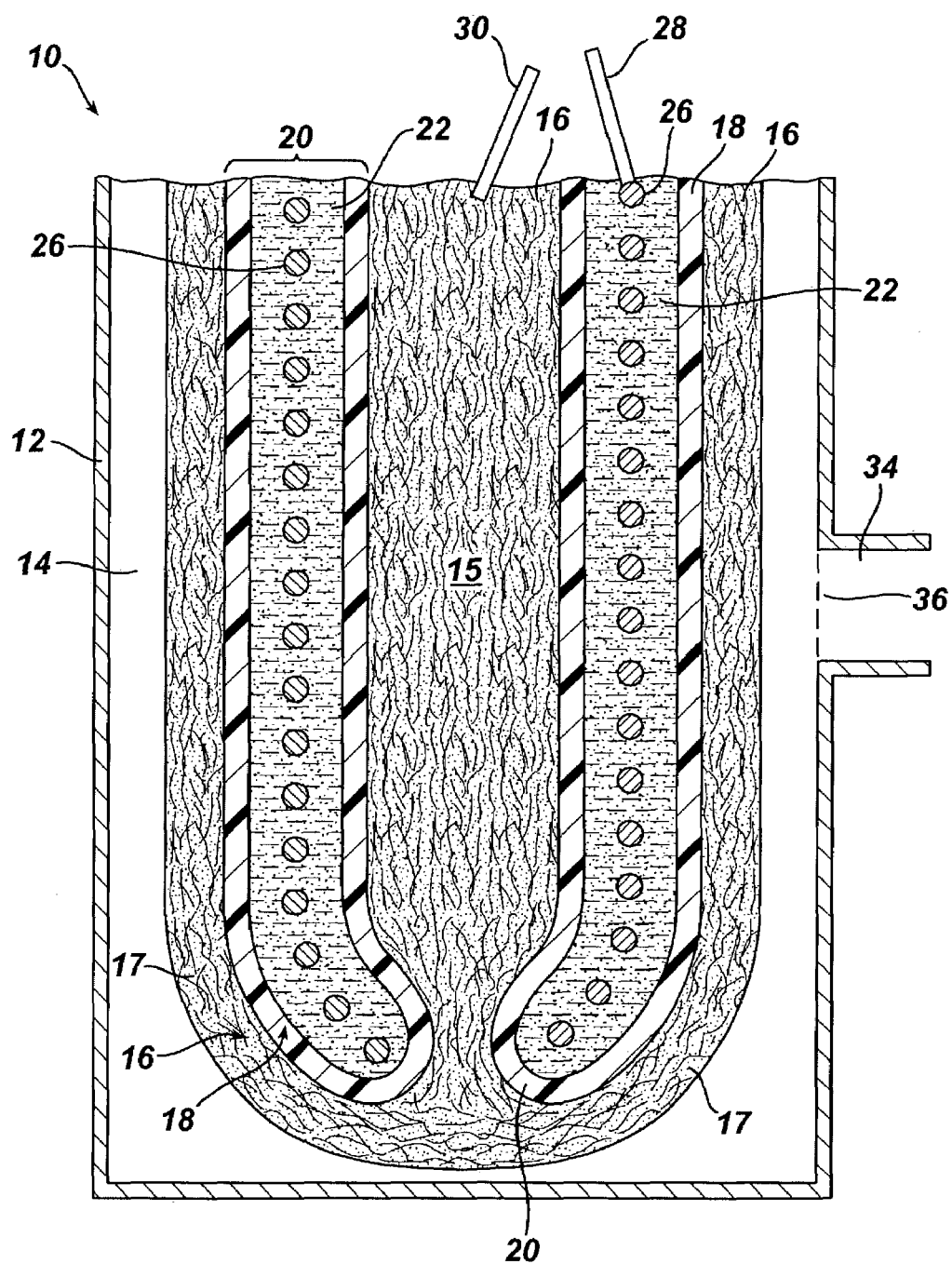
FIGS. 1 and 1A are partial cross-sectional side views of hydrogen-generating cells.

Referring to FIG. 1, a hydrogen generator 10 includes a housing 12 defining an internal volume 14. Within the internal volume of the hydrogen generator is a cathode 16 which contains a cathode catalyst material. Cathode 16 forms a layer 15 at the center of housing 12 and a layer 17 near the outer perimeter of the housing. Housing 12 further includes a separator 18 that forms an envelope 20. The envelope is positioned between the center cathode layer 15 and the perimeter cathode layer 17. Envelope 20 encases an anode 22 which contains anode active material. Cathode 16 and anode 22 both are submerged in a common electrolyte.

In the hydrogen generator 10 of FIG. 1, cathode 16 is separated from anode 22; i.e., the cathode is located on a metal substrate which is separate from, and not permanently connected to, the anode.

Anode 22 can be formed of any of the standard materials used in an alkaline battery anode. For example, anode 22 can be a gel that includes metal (e.g., metal particles), a gelling agent, and minor amounts of additives, such as gassing inhibitor.

A suitable anode metal includes a Group IIa metal, a Group Ib metal, a Group IIIa metal, a Group IIb metal, iron, tin, manganese, titanium or zirconium. For example, the anode metal can include zinc.

The anode metal can be zinc in the form of particles, such as those that are conventionally used in zinc slurry anodes. The anode can include, for example, between 60% by weight and 80% by weight, between 65% by weight and 75% by weight, or between 67% by weight and 71% by weight of zinc particles. The zinc particles can be small zinc-based particles, such as zinc fines or zinc dust. A zinc-based particle can be formed of zinc or a zinc alloy. A zinc-based particle can be formed by manufacturing processes including gas atomization, centrifugal atomization, melt spinning, and air blowing.

Zinc fines are zinc-based particles that have dimensions suitable to pass through a standard 200 mesh screen (i.e., −200 mesh) in a normal sieving operation, such as when a sieve is shaken by hand. Zinc dust contains zinc-based particles that have dimensions suitable to pass through a standard 325 mesh screen (i.e., −325 mesh) in a normal sieving operation. The zinc-based particles can be nominally spherical or nonspherical in shape. Nonspherical particles can be acicular in shape (i.e., having a length along a major axis at least two times a length along a minor axis) or flake-like in shape (i.e., having a thickness no more than 20 percent of the maximum linear dimension). The zinc particles can have a surface area of between 200 $cm^2$/gram and 300 $cm^2$/gram.

In some embodiments, the anode can include a hydrogen storage composition, such as a metal hydride (e.g., titanium hydride, zirconium hydride, reversible hydrides of nickel or lanthanum, or a misch metal).

Anode 22 can include a gelling agent. Examples of gelling agents include polyacrylic acids, grafted starch materials, salts of polyacrylic acids, polyacrylates, carboxymethylcellulose, or combinations thereof. Examples of such polyacrylic acids are Carbopol 940 and 934 (available from B.F. Goodrich) and Polygel 4P (available from 3V), and an example of a grafted starch material is Waterlock A221 (available from Grain Processing Corporation, Muscatine, Iowa). An example of a salt of a polyacrylic acid is Alcosorb G1 (available from Ciba Specialties).

Anode 22 preferably has a high surface area in order to support a rapid rate of dissolution of the anode active material and electron production, as well as a high rate of hydrogen gas generation on the catalyst cathode. For example, anode 22 can have a surface area between 50 $cm^2$/gram and 500 $cm^2$/gram.

Cathode 16 can include a noble metal catalyst, for example, palladium and/or ruthenium catalytic material. The cathode catalytic materials can be supported on carbon and coated on a fine metal gauze or mesh, such as nickel EXMET™, available from Exmet Corp. (Naugatuck, Conn.). For example, a suitable cathode includes carbon-supported palladium and carbon-supported ruthenium coated (e.g., painted) on a nickel EXMET™. The cathode coating can include between 0.5% by weight and 2% by weight of 1% palladium supported on activated carbon, available from Alfa Aesar, and between 2% by weight and 6% by weight of 5% ruthenium supported on activated carbon, available from Alfa Aesar.

The cathode coating can include a binder. Examples of binders include polyethylene powders, polypropylene, polybutylene, nylon, polyacrylamides, acrylics, polyvinyl chloride, polystyrene, polymethylpentene, Portland cement, and fluorocarbon resins, such as polyvinylidene fluoride and polytetrafluoroethylene. An example of a polyethylene binder is powdered high-density polyethylene (e.g., Coathylene HA-1681, available from Hoechst). The cathode coating can include between 0.1% and 1% binder by weight.

In some cases, the cathode includes a carbon-supported palladium and ruthenium catalyst and a binder that is less hydrophobic than polytetrafluoroethylene (such as powdered high density polyethylene) coated on a nickel EXMET™ screen.

For example, a catalyst cathode coating including 14% powdered high density polyethylene (Coathylene Grade HA-1681, from Hoechst-Celanese Corp.), 50% n-propanol, 1% of 1% palladium on activated carbon (from Alfa Aesar), 4% of 5% ruthenium on activated carbon (from Alfa Aesar), and 31% activated carbon powder (from Alfa Aesar) was prepared as follows. The powdered high density polyethylene and the n-propanol were mixed. Thereafter, the carbon-supported palladium and the carbon-supported ruthenium were added to the mixture, creating a slurry. (In some cases, the carbon supported catalyst material can be added to the mixture as a water suspension (e.g., 50% solids and 50% water). In such cases, the weight of water, which will be evaporated in subsequent steps, is not counted in the recipe.) The slurry was then coated onto a nickel EXMET™ screen by brushing or coating using a doctor blade. After the liquid evaporated, the coated screen was heated in an oven at 190° C. for ten minutes, to sinter the binder and powdered catalyst components to the screen.

Cathode 16 can include other additives. For example, the cathode can include a surfactant (e.g., Triton X-100, available from Sigma-Aldrich). The surfactant can help to wet the cathode, thereby preventing the binder from coagulating and decreasing the effectiveness of the cathode material.

Electrolyte 24 can be an alkaline electrolyte (e.g., potassium hydroxide or sodium hydroxide). In some cases, the electrolyte contains dissolved salts, oxides, or hydroxides of bismuth, tin, indium, mercury, lead, cadmium, or thallium. The electrolyte can include a dissolved cation or anion of the metal anode (e.g., an aluminum oxide, sodium aluminate, potassium aluminate, a zinc oxide, a zinc hydroxide, or calcium salts). In some embodiments, the electrolyte contains corrosion inhibitors, such as quaternary ammonium salts or a non-ionic, anionic, or cationic surfactant.

Envelope 20 also encases a current collector 26. The current collector coils through the anode active material. An electronic conductor 28 is connected to current collector 26 and terminates outside of the cell. Another electronic conductor 30 is connected to cathode 16 and also terminates outside of the cell. Conductor 28 is insulated by, for example, a plastic coating, as the conductor passes through the interior volume of the housing, before it exits the housing.

When conductors 28 and 30 make contact, current begins to flow through them. When current begins to flow through them, zinc is oxidized at the anode and water is reduced at the cathode, leading to an overall reaction in which hydrogen gas is produced according to equations (1), (2) and (3):

$$Zn + 2OH^- \rightarrow ZnO + H_2O + 2e^- \quad (1)$$

$$2H_2O + 2e^- \rightarrow 2OH^- + H_2 \quad (2)$$

$$Zn + H_2O \rightarrow ZnO + H_2 \quad (3)$$

Housing 12 includes a hydrogen gas outlet 34, through which hydrogen gas can exit the housing.

Figure 1A:
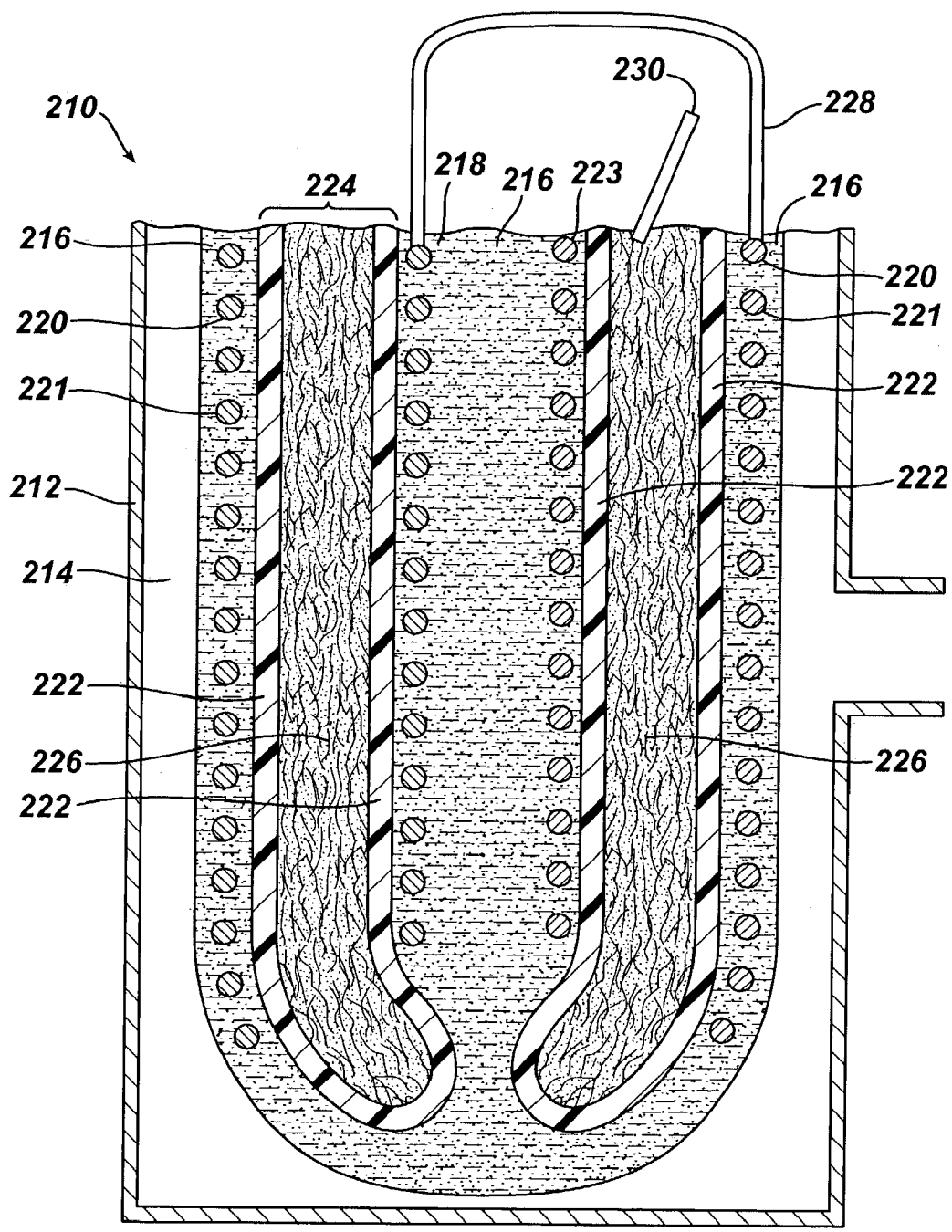

Other embodiments of a hydrogen generator are possible. Referring to FIG. 1A, a hydrogen generator 210 has a reverse configuration of the hydrogen generator 10 of FIG. 1. Hydrogen generator 210 includes a housing 212 defining an internal volume 214. Anode 216 forms a layer 218 at the center of the housing and a layer 220 near the outer perimeter of the housing. Anode layers 218 and 220 further include current collectors 221 and 223. Current collectors 221 and 223 are connected to each other, either within the housing or exterior to the housing. A separator 222 forms an envelope 224 which encases cathode 226. The envelope is positioned between the center anode layer 218 and the perimeter anode layer 220. An electronic conductor 228 is connected to current collectors 221 and 223, and extends outside of the cell. Another electronic conductor 230 is connected to cathode 226, and also extends outside of the cell. When conductors 228 and 230 make contact, current begins to flow through them.

Separator 18 can be a laminate of a non-woven fabric and a membrane (e.g., DURALAM™, from the Gillette Company). The non-woven layer can be a fibrous polymer fabric (e.g., polyvinyl alcohol fibers). The separator can include a single layer or multiple layers of the non-woven fabric. The non-woven fibrous polymer fabric can be laminated to a membrane such as cellophane. In some cases, the separator is pleated, and thus can allow for the expansion of zinc when it reacts to form zinc oxide. With such a configuration, the separator can expand without tearing.

Housing 12 can be a cylindrical housing. The housing can have a length of between 2.5 cm and 30 cm, and a width or diameter of between 1 cm and 20 cm. The housing can have a volume of between 2 cm$^3$ and 9,400 cm$^3$. The hydrogen generator can have a mass of between 2.5 grams and 25 kilograms.

Housing 12 can be, for example, a plastic or a metal. Suitable metals include brass, copper, tin, steel, stainless steel, nickel, or combinations thereof. The housing can include an inner metal wall and an outer electrically non-conductive material, such as heat-shrinkable plastic. When the housing is metal, it can serve as a current collector or as an electrical feedthrough from a current collector to the exterior of the generator.

In the hydrogen generator 10 of FIG. 1, in which the cathode approaches or contacts the housing, preferred materials for the housing include steel, stainless steel, nickel, or combinations thereof. The housing may also be coated or plated on its interior surface with nickel, cobalt, tin, or a carbon conductive coating, in order to lower the electrical resistance of the interface between the housing and the cathode.

In the hydrogen generator 210 of FIG. 1A, in which the anode approaches or contacts the housing, the preferred materials for the housing are copper, brass, tin, or combinations thereof. The housing may also be coated or plated on its interior surface with bismuth, tin, indium, cadmium, lead, or thallium, in order to minimize hydrogen gas evolution directly from the anode when the generator is deactivated.

Hydrogen gas outlet 34 in housing 12 can be equipped with a hydrophobic, hydrogen-permeable membrane 36 (e.g., a fluoropolymer membrane.) Suitable membranes are available from Pall Corp. (East Hills, N.Y.)., or W. L. Gore and Associates, Inc. (Dallas, Tex.). The membrane can help to limit or prevent electrolyte leakage from the housing. Although housing 12 in FIG. 1 has only one hydrogen gas outlet, in some cases the housing has more than one hydrogen gas outlet (e.g., between 2 and 8 hydrogen gas outlets).

To decrease the rate of gassing when the hydrogen generator is turned off (i.e., when conductors 28 and 30 are not in contact with each other), the anode metal can be an alloy with gassing inhibitors, such as bismuth, tin, indium, mercury, lead, cadmium, or thallium. Preferred alloying elements include bismuth, tin, and indium. For example, the metal can be a zinc alloy including up to 500 ppm indium and up to 500 ppm bismuth. Traces of other metals (e.g., aluminum or calcium) may also be added in order to suppress localized hydrogen gas evolution at the metal anode, or to promote beneficial action of any tin, indium, or bismuth that is alloyed with the anode metal.

Electronic conductors 28, 30, 228, and 230 can include copper or brass wire. The wire can be plated or coated with a thin layer of indium, tin, or lead. Because the anodic and cathodic reactions are localized on two separate electrodes having separator material between them, the electrochemical reaction between the electrodes may not occur until the electronic conductors make contact with each other. When the conductors make contact, the electrochemical reaction can begin, resulting in the production of hydrogen gas. In some cases, the conductors are insulated by, e.g., a sheath of perfluoroalkoxy TEFLON™ (available from DuPont), to prevent the conductors from making undesirable contact with other materials within the housing. Conductor 28 can be soldered, welded, or mechanically fixed to current collector 26, and conductor 228 can be soldered, welded, or mechanically fixed to current collectors 221 and 223. Conductor 30 can be soldered, welded, or mechanically fixed to the cathode screen of cathode 16, and conductor 230 can be soldered, welded, or mechanically fixed to the cathode screen of cathode 226. In order to limit or prevent corrosion, the joints can be covered in, e.g., asphalt.

An example of a hydrogen generator was prepared as follows.

A polypropylene container (about 2.75 centimeters in diameter and about 4.75 centimeters in length) was perforated by drilling approximately 120 holes, each about 3 millimeters in diameter, in a regular distribution over the container surface.

The container was wrapped with a DURALAM™ battery separator (from the Gillette Company) on its outside surface. The overlapping seams and ends of the separator were sealed using a solution of asphalt in toluene.

A cathode was placed within the container. The cathode included a woven nickel screen (3.75 centimeters×10.75 centimeters) pasted with a 50/50 mixture of 1% palladium supported on carbon black, 5% ruthenium supported on carbon black, and a fluoropolymer (TEFLON™ Dupont product type 30, available from DuPont). Approximately 3.34 grams of catalyzed carbon black were included for every 1.17 milliliters of Teflon emulsion. The total weight of the dry coating was 2.34 grams (on 40.3 cm$^2$ of nickel screen). The catalyzed cathode included 11.7 milligrams of palladium and 58.5 milligrams of ruthenium.

The catalyst screen was soldered to a polyurethane foam-sheathed copper wire. The wire was threaded through an asphalt-sealed feedthrough to the exterior of the outer container. The solder joint to the nickel screen was covered in asphalt.

The assembly was disposed co-axially within a second container. The second container was a polyethylene tube that was approximately 3.25 centimeters in diameter and ten centimeters in length.

The second container was disposed coaxially within a third container. The third container was a heavy-walled fluoropolymer pipe with screwed endcaps.

The innermost container was filled with 9N potassium hydroxide solution.

The innermost container communicated through both of its ends to the third, outer, container, which was partially filled with more 9N potassium hydroxide.

The annular space between the separator (wrapped around the perforated inner container) and the second, middle, container was filled with a gelled, alkaline, zinc powder slurry containing 64% zinc. Within this annular compartment there was also a spiral copper wire which contacted the zinc slurry. The wire was threaded through an asphalt-sealed feedthrough in the outer container to the exterior of the apparatus.

The hydrogen generator 10 of FIG. 1 can be used as a hydrogen source for, e.g., a hydrogen fuel cell, in an electrochemical cell similar to that described below with reference to FIG. 2.

Figure 2:
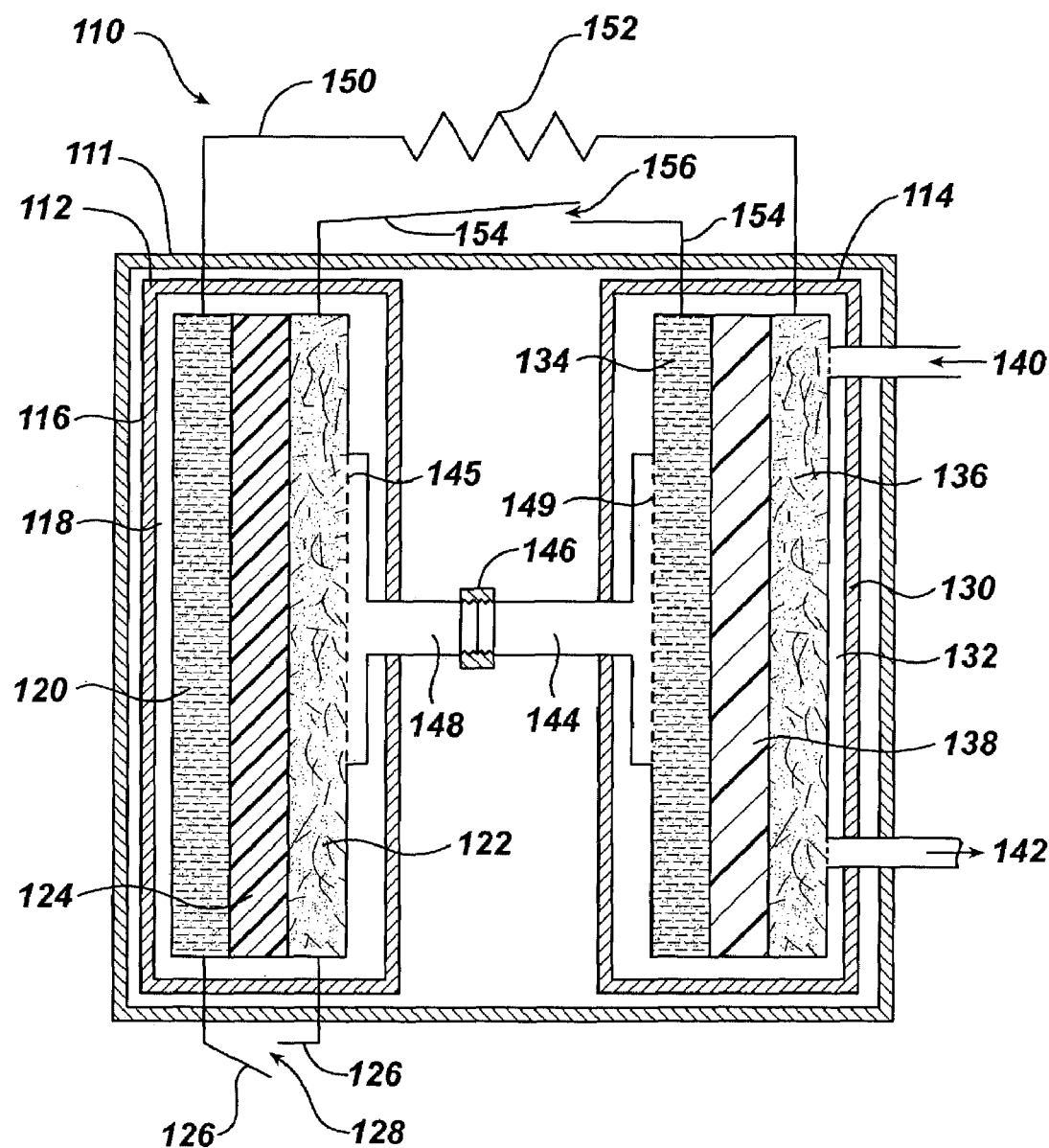
FIG. 2 is a cross-sectional side view of an electrochemical cell.

Referring to FIG. 2, an electrochemical cell 110 has a housing 111. Within housing 111 is a hydrogen generator 112 that is connected to a hydrogen fuel cell 114. The hydrogen generator includes a housing 116 defining an internal volume 118. Disposed within the internal volume are an anode 120 and a cathode 122, separated by a separator 124. The hydrogen generator also includes a conductor 126 having a switch 128. An electrolyte permeates most of the void space in the hydrogen generator, filling the pores in separator 124 and contacting both anode 120 and cathode 122.

The fuel cell 114 has a housing 130 defining an internal volume 132. Within the internal volume are an anode 134 and a cathode 136, separated by an electrolyte 138. The housing also has an oxygen or air inlet 140, a water outlet 142 (through which oxygen-depleted air can also escape), and a hydrogen inlet 144. The hydrogen inlet 144 is releasably connected, by means of a connector 146, to a hydrogen gas outlet 148 in hydrogen generator housing 116. The connection between the hydrogen generator and the hydrogen fuel cell can provide a conduit for hydrogen gas. Thus, hydrogen gas produced by the hydrogen generator can travel to the fuel cell, where it can be consumed by fuel cell anode 134. The connection between the hydrogen generator and the fuel cell can be closed or opened as needed.

The hydrogen generator can include a gas-permeable, liquid-impermeable membrane 145, such as Gore, EXCEL-LERATOR™ Gas Diffusion Membrane (4 mil, part number 243042966, available from W. L. Gore Associates, Dallas, Tex.), to limit or prevent undesirable leakage into or out of the generator. For the same reason, the fuel cell can include a similar gas-permeable, liquid-impermeable membrane 149.

FIG. 2 shows the electrochemical cell 110, the fuel cell 114, and the hydrogen generator 112 each with their own housings. In some cases, however, the fuel cell and the hydrogen generator both are disposed within a single housing, with an integral coupling between the fuel cell and the generator to transmit hydrogen gas. The fuel cell and the hydrogen generator can be in individual, attachable housings that are not located in one big housing. In some cases, the hydrogen generator can be detached from the fuel cell, disposed of, and replaced with a new hydrogen generator.

In addition to being connected mechanically, the hydrogen generator and hydrogen fuel cell can also be in electrical connection with each other, as shown in FIG. 2. In FIG. 2, a conductor 150 connects hydrogen generator anode 120 to fuel cell cathode 136. Conductor 150 can include a load 152. A second conductor 154 connects hydrogen generator cathode 122 to fuel cell anode 134. Conductor 154 can have a switch 156. When switch 156 is activated, the fuel cell and the hydrogen generator are in series electrical connection.

When the hydrogen generator and the hydrogen fuel cell are electrically connected to each other in this way, the voltage produced by the hydrogen generator (e.g., up to 0.4 V) is added to that produced by the fuel cell (e.g., around 1.0V), to produce a final voltage of, e.g., up to 1.4 V.

In some cases, the hydrogen generator is not electrically connected to the fuel cell. In such cases, a switch 128 (shown in FIG. 2) establishes an electrical connection between anode 120 and cathode 122 of the hydrogen generator. When switch 128 is closed, the hydrogen generator produces hydrogen. In such a case, it is preferable for the electrochemical cell to include a control or controls which sense hydrogen flow or pressure, and which can automatically control the action of switch 128. The rate of hydrogen generation can be controlled to balance it with the rate of hydrogen consumption by the fuel cell so that a moderate constant flow and pressure is maintained, in balance with the demand of the fuel cell.

During operation of electrochemical cell 110 of FIG. 2 in the series electrical connection mode, hydrogen leakage can occur between the generator and the fuel cell sections. As a result, the hydrogen pressure at fuel cell inlet 144 can decline. In such cases, switch 128 can be temporarily closed whenever the pressure drops below a certain minimum threshold. Such an action can occur automatically, in response to a signal from, for example, a pressure gauge or transducer which communicates either to hydrogen outlet 148 of the generator or to hydrogen inlet 144 of the fuel cell. Alternatively, a form of proportional control may be applied to regulate the current at switch 128, thereby maintaining a smooth, constant regulation of hydrogen pressure. When proportional control is used, the switch 128 is not simply an on-off switch. Rather, it regulates hydrogen generation in proportion to the degree to which the actual pressure deviates from a desired operating pressure. If the actual pressure is only slightly below the desired pressure, then a small current is allowed to flow through switch 128. If the actual pressure is substantially below the desired pressure, then a large current is allowed to flow through switch 128.

The hydrogen generator in electrochemical cell 110 of FIG. 2 can be, for example, the hydrogen generator 10 described with reference to FIG. 1. When conductors 28 and 30 make contact, the reactions of equations (1), (2), and (3) take place in the hydrogen generator.

The hydrogen gas that is produced by the hydrogen generator in its overall reaction travels through hydrogen outlet 148 and into hydrogen inlet 144, where it can be used by the fuel cell 114 to generate current. The electrons produced at anode 120 move through conductor 150 to fuel cell cathode 136, where the electrons can be used in the reduction reaction that occurs at that site.

In fuel cell 114, anode 134 oxidizes hydrogen gas to produce protons and electrons. The protons move through electrolyte 138 to cathode 136, where the protons combine with oxygen, provided through oxygen or air inlet 140, and electrons traveling through conductor 150 to produce water. The water can exit the fuel cell through water outlet 142. The electrons produced by the oxidation move through conductor 154 (if switch 156 is closed), to hydrogen generator cathode 122, where they can be used to reduce water.

Figure 3:
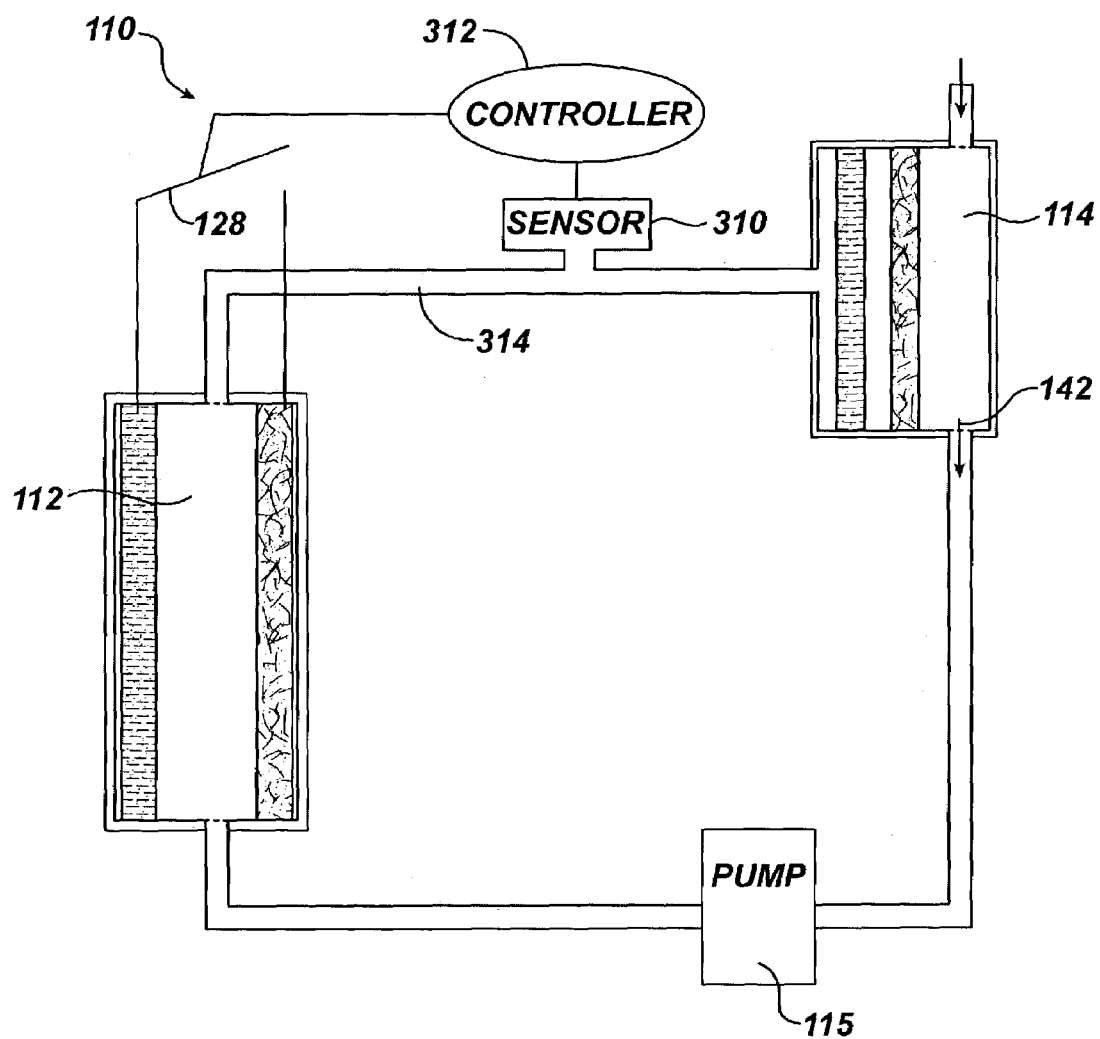
FIG. 3 is a schematic of an electrochemical cell.

Referring to FIG. 3, in some cases water that exits through water outlet 142 of hydrogen fuel cell 114 can be recycled to hydrogen generator 112 by, for example, a pump 115. At hydrogen generator 112, the water can be reduced to form more hydrogen gas.

Thus, in the fuel cell, water is produced in an overall reaction according to equations (4), (5), and (6):

$$H_2 \rightarrow 2H^+ + 2e^- \quad (4)$$

$$\tfrac{1}{2}O_2 + 2H^+ + 2e^- \rightarrow H_2O \quad (5)$$

$$H_2 + \tfrac{1}{2}O_2 \rightarrow H_2O \quad (6)$$

The overall reaction for electrochemical cell 110, therefore, is that of equation (7):

$$Zn + \tfrac{1}{2}O_2 \rightarrow ZnO \quad (7)$$

The anode 134 of the fuel cell can be formed of a material capable of interacting with hydrogen gas to form protons and electrons. The material can be any material capable of catalyzing the dissociation and oxidation of hydrogen gas. Examples of such materials include, for example, platinum, platinum alloys, such as platinum-ruthenium, and platinum dispersed on carbon black.

Cathode 136 can be formed of a material capable of catalyzing the reaction between oxygen, electrons, and protons to form water. Examples of such materials include, for example, platinum, platinum alloys, transition metals, transition metal oxides, and noble metals dispersed on carbon black.

Electrolyte 138 is capable of allowing ions to flow through it while also providing a substantial resistance to the flow of electrons. In some embodiments, electrolyte 138 is a solid polymer (e.g., a solid polymer ion exchange membrane). Electrolyte 138 can be a solid polymer proton exchange membrane. An example of a solid polymer proton exchange membrane is a solid polymer containing sulfonic acid groups. Such membranes are commercially available from E.I. DuPont de Nemours Company (Wilmington, Del.) under the trademark NAFION. Alternatively, electrolyte 138 can also be prepared from the commercial product GORE-SELECT, available from W.L. Gore & Associates (Elkton, Md.). In some cases, electrolyte 138 can be a polyphosphazine membrane or a bulk acid (such as phosphoric acid).

In some embodiments, electrolyte 138 can be an ionically conducting liquid electrolyte (e.g., aqueous potassium hydroxide solution, aqueous sodium hydroxide solution, aqueous sulfuric acid solution, or aqueous phosphoric acid solution). The liquid electrolyte can be a free liquid or it can be immobilized by the addition of a gelling agent, such as a polymer (e.g., polyacrylic acid or polymethacrylic acid), or an absorbing agent (e.g., silica gel, fumed silica, or clay).

Housing 130 can be any conventional housing commonly used in fuel cells. For example, housing 130 can be a plastic, carbon, or metal container such as steel, stainless steel, graphite, nylon, polyvinyl chloride, poly-tetrafluoroethylene, polyvinylidene fluoride, perfluoroalkoxy resin, or a combination of metals, carbons, and plastics. Plastics may be filled, e.g., with mineral fillers. Alternatively, plastics may be unfilled.

Hydrogen generator 112 can be primed so that hydrogen gas is immediately available to fuel cell 114 when switch 156 is closed and electrochemical cell 110 is activated. When switch 128 on the hydrogen generator is closed, the hydrogen generator starts to generate hydrogen. If connector 146 is closed, then hydrogen gas can build up in hydrogen outlet 148. Once connector 146 is opened, the hydrogen gas will be immediately available to fuel cell 114.

Referring to FIG. 3, in some cases electrochemical cell 110 includes a sensor 310, which sends an electrical signal to a controller 312. Controller 312 then activates or deactivates hydrogen generator 112 according to the signal. The controller and the sensor can be connected to each other by an electronic signal conditioning device (e.g., an electronic filter that can fix spikes or dips in the sensor signal, such as those caused by vibration or shock). The controller can be connected to a conductor. In response to a signal from, e.g., the sensor, the controller can cause a variable amount of current to pass through the conductor. In some cases, the controller can cause the conductor to exhibit a variable resistance.

The sensor can be a pressure sensor. As shown in FIG. 3, the sensor can be connected to the hydrogen gas conduit 314 between hydrogen generator 112 and hydrogen fuel cell 114. Thus, the sensor can sense pressure due to hydrogen gas accumulation. If the pressure is high, then the sensor can send a signal to the controller to reduce hydrogen gas production. If the pressure is low, then the sensor can send a signal to the controller to increase hydrogen gas production.

The sensor can be a voltage sensor. In such cases, the sensor can sense the voltage being produced by the hydrogen fuel cell. If the voltage is too low, then the voltage sensor can send a signal to the controller to increase hydrogen gas production (and thereby increase voltage produced by the fuel cell). On the other hand, if the voltage is too high, then the voltage sensor can send a signal to the controller to decrease hydrogen gas production.

Other embodiments are within the scope of the following claims.

What is claimed is:

1. An electrochemical cell capable of providing electrical current, comprising:
   an electrochemical hydrogen generator including:
      a first cathode which generates hydrogen gas via an electrolytic reaction, and
      a first anode adjacent to the first cathode;
   a hydrogen fuel cell including:
      a second anode which oxidizes hydrogen gas, and
      a second cathode adjacent to the second anode;
   an electrical conductor external of the electrochemical cell for providing the electrical current to a load external of the electrochemical cell;
   wherein the first anode is electrically connected to the second cathode, and the first cathode is electrically connected to the second anode, and wherein the hydrogen generator contributes electric power to the load.

2. An electrochemical cell capable of providing electrical current, comprising an electrochemical hydrogen generator that generates hydrogen gas electrolycally, in series electrical connection with a hydrogen fuel cell,
   the electrochemical cell also comprising an electrical conductor external of the electrochemical cell for providing current generated by the electrochemical cell to a load external of the electrochemical cell and
   wherein the hydrogen generator contributes electric power to the load.

3. The cell of claim 2, wherein the electrochemical hydrogen generator comprises a first cathode which generates hydrogen gas and a first anode adjacent to the first cathode.

4. The cell of claim 3, wherein the hydrogen fuel cell includes a second anode which oxidizes hydrogen gas and a second cathode adjacent to the second anode.

5. The cell of claim 4, wherein the first anode is electrically connected to the second cathode and wherein the first cathode is electrically connected to the second anode.

6. The cell of claim 2, wherein the hydrogen fuel cell includes a second anode which oxidizes hydrogen gas and a second cathode which is adjacent to the second anode.

7. The cell of claim 2, wherein the hydrogen generator includes a gas outlet, and wherein the hydrogen fuel cell includes a gas inlet in fluid communication with the gas outlet.

8. The cell of claim 2, wherein the hydrogen generator comprises a first housing.

9. The cell of claim 8, wherein the hydrogen fuel cell comprises a second housing.

10. The cell of claim 9, wherein the first housing is releasably engageable with the second housing.

11. The cell of claim 2, wherein the hydrogen fuel cell and the hydrogen generator are disposed within a single housing.

12. The cell of claim 2, wherein the hydrogen generator comprises a hydrogen-generating anode.

13. The cell of claim 12, wherein the hydrogen-generating anode comprises a metal selected from the group consisting of zinc, aluminum, titanium, zirconium, and tin.

14. The cell of claim 12, wherein the hydrogen-generating anode comprises a hydrogen storage composition.

15. The cell of claim 14, wherein the hydrogen storage composition is a metal hydride or a misch metal alloy.

16. The cell of claim 2, wherein the hydrogen fuel cell comprises an acidic polymer membrane electrolyte.

17. The cell of claim 2, wherein the hydrogen fuel cell comprises an acidic polymer membrane electrolyte.

18. The cell of claim 2, further comprising a controller.

19. The cell of claim 17, further comprising a sensor.

20. A method of generating an electrical current comprising:
(a) forming an electrical connection between a first anode of an electrochemical hydrogen generator in which hydrogen gas is generated electrolytically and a second cathode of a hydrogen fuel cell;
(b) forming an electrical connection between a first cathode of the electrochemical hydrogen generator and a second anode of the hydrogen fuel cell; and (c) providing the electrical current generated as a result of the electrical connections formed in (a) and (b) to a load,
wherein the hydrogen generator contributes electric power to the load.

21. The method of claim 20, wherein the first cathode generates hydrogen gas, and the first anode is adjacent to the first cathode.

22. The method of claim 20, wherein the second anode oxidizes hydrogen gas, and the second cathode is adjacent to the second anode.

23. A method of generating an electrical current comprising:
(a) generating a first electron from an oxidation half cell of an electrochemical hydrogen generator in which hydrogen gas is generated electrolytically (b) transmitting the first electron to a reduction half cell of a hydrogen fuel cell, and
(c) providing the electrical current generated in part because of (a) and (b) to a load,
wherein the hydrogen generator contributes electric power to the load.

24. The method of claim 23, further comprising transmitting a second electron from an oxidation half cell of the hydrogen fuel cell to a reduction half cell of the hydrogen generator.

25. The method of claim 24, further comprising generating hydrogen from the hydrogen generator and oxidizing the generated hydrogen at the fuel cell.

26. The method of claim 25, further comprising transmitting the generated hydrogen to the fuel cell through a conduit fluidly connecting the hydrogen generator and the fuel cell.

* * * * *

UNITED STATES PATENT AND TRADEMARK OFFICE
CERTIFICATE OF CORRECTION

PATENT NO. : 7,169,497 B2  Page 1 of 1
APPLICATION NO. : 10/438318
DATED : January 30, 2007
INVENTOR(S) : Stuart M. Davis and Klaus Brandt It is certified that error appears in the above-identified patent and that said Letters Patent is hereby corrected as shown below:

In claim 2, col. 12 line 56, delete "electrolycally" and insert --electrolytically--.

In claim 16, col. 13 line 31, delete "2" and insert --1--.

Signed and Sealed this

Twenty-seventh Day of May, 2008

JON W. DUDAS
*Director of the United States Patent and Trademark Office*